(12) United States Patent
Witzmann et al.

(10) Patent No.: US 11,872,188 B2
(45) Date of Patent: *Jan. 16, 2024

(54) METHOD FOR MANUFACTURING A GLASS TUBE SEMI-FINISHED PRODUCT OR A HOLLOW GLASS PRODUCT MADE THEREFROM WITH MARKINGS, AND USES OF THE SAME (71) Applicant: SCHOTT AG, Mainz (DE)

(72) Inventors: André Witzmann, Waldershof (DE); Ulla Trinks, Mitterteich (DE); Reinhard Männl, Mitterteich (DE)

(73) Assignee: SCHOTT AG, Mainz (DE)

( * ) Notice: Subject to any disclaimer, the term of this patent is extended or adjusted under 35 U.S.C. 154(b) by 1275 days.

This patent is subject to a terminal disclaimer.

(21) Appl. No.: 15/835,659

(22) Filed: Dec. 8, 2017

(65) Prior Publication Data
US 2018/0168928 A1 Jun. 21, 2018

(30) Foreign Application Priority Data
Dec. 21, 2016 (DE) .......................... 102016125129.1

(51) Int. Cl.
*A61J 1/14* (2023.01)
*C03C 23/00* (2006.01)
(Continued)

(52) U.S. Cl.
CPC ........... *A61J 1/1468* (2015.05); *B23K 26/361* (2015.10); *B23K 26/362* (2013.01); *C03B 23/04* (2013.01);
(Continued)

(58) Field of Classification Search
None
See application file for complete search history.

(56) References Cited

U.S. PATENT DOCUMENTS 2,378,146 A 6/1945 Luertzing
3,394,263 A 7/1968 Baker
(Continued)

FOREIGN PATENT DOCUMENTS

CN 105271655 1/2016
DE 3121138 3/1982
(Continued)

OTHER PUBLICATIONS

"Glassblowing (Wikipedia)", Internet Citation, Feb. 8, 2011 (Feb. 8, 2011), pp. 1-8, http://en.wikipedia.org/w/index.php?oldid=412663373 [downloaded on Sep. 12, 2011].

*Primary Examiner* — Queenie S Dehghan
(74) *Attorney, Agent, or Firm* — Ruggiero McAllister & McMahon LLC (57) ABSTRACT

A glass tube semi-finished product or a hollow glass product manufactured from the glass tube semi-finished product is provided with a first marking with information regarding origin and manufacture of the glass tube semi-finished product and a second marking, the information of which second marking is linked to the information of the first marking, so as to enable a determination regarding authenticity of the glass tube semi-finished product, origin of the glass tube semi-finished product, and/or origin of an apparatus with which the first and/or second marking was generated on the glass tube semi-finished product. The first marking is a marking that is produced at temperatures above the transformation temperature of the glass in a counterfeit-proof manner. The combination of two markings provides a high level of protection against counterfeiting.

11 Claims, 8 Drawing Sheets

(51) Int. Cl.
  *C03C 17/00* (2006.01)
  *C03B 23/04* (2006.01)
  *B23K 26/362* (2014.01)
  *B23K 26/361* (2014.01)
  *G06Q 30/018* (2023.01)

(52) U.S. Cl.
  CPC .......... *C03C 17/00* (2013.01); *C03C 23/0025* (2013.01); *G06Q 30/018* (2013.01); *A61J 2205/30* (2013.01); *C03C 2218/119* (2013.01)

(56) References Cited

U.S. PATENT DOCUMENTS

| | | |
|---|---|---|
| 3,565,536 A | 2/1971 | Wuellner et al. |
| 3,777,171 A | 12/1973 | Hollenbeck |
| 3,880,637 A | 4/1975 | Dichter |
| 4,136,779 A | 1/1979 | Bieringer |
| 4,378,494 A | 3/1983 | Miller |
| 4,483,615 A | 11/1984 | Bieringer et al. |
| 4,487,322 A | 12/1984 | Juvinall |
| 4,720,192 A | 1/1988 | Willison |
| 5,252,115 A | 10/1993 | Mannl |
| 5,331,174 A | 7/1994 | Dassler et al. |
| 5,611,834 A | 3/1997 | Walter |
| 6,211,952 B1 | 4/2001 | Weiland et al. |
| 6,595,029 B1 | 7/2003 | Dick |
| 6,633,377 B1 | 10/2003 | Weiss et al. |
| 6,638,440 B1 | 10/2003 | Grimard |
| 6,674,043 B2 | 1/2004 | Trinks |
| 8,196,807 B2 | 6/2012 | Grimard |
| 9,378,445 B2 | 6/2016 | Stuck et al. |
| 9,514,131 B1 | 12/2016 | Bochenko |
| 9,524,623 B2 | 12/2016 | Vogel |
| 9,701,564 B2 | 7/2017 | Bookbinder et al. |
| 9,844,951 B2 | 12/2017 | Krief |
| 10,327,987 B1 * | 6/2019 | Bochenko .......... B65D 51/1688 |
| 2003/0029849 A1 | 2/2003 | Trinks |
| 2004/0239038 A1 | 12/2004 | Kramp |
| 2005/0023337 A1 | 2/2005 | Benischke |
| 2005/0218126 A1 | 10/2005 | Leyvraz |
| 2006/0112729 A1 | 6/2006 | Sakoske |
| 2006/0267250 A1 | 11/2006 | Gerretz et al. |
| 2009/0095803 A1 | 4/2009 | Benischke |
| 2009/0120253 A1 | 5/2009 | Benischke |
| 2009/0159174 A1 | 6/2009 | Grimard |
| 2009/0159654 A1 | 6/2009 | Grimard |
| 2010/0089097 A1 | 4/2010 | Brack et al. |
| 2010/0319400 A1 | 12/2010 | Geisel |
| 2013/0169732 A1 | 7/2013 | Witzmann |
| 2014/0358270 A1 | 12/2014 | Sudo et al. |
| 2014/0373574 A1 | 12/2014 | Moseler |
| 2015/0064779 A1 | 3/2015 | Schultz |
| 2015/0114043 A1 | 4/2015 | Risch et al. |
| 2015/0197443 A1 | 7/2015 | Voelkl |
| 2016/0016841 A1 | 1/2016 | Frost et al. |
| 2016/0074865 A1 | 3/2016 | Rao et al. |
| 2016/0139062 A1 | 5/2016 | Faraldi et al. |
| 2016/0272527 A1 | 9/2016 | Moseler |
| 2017/0084050 A1 | 3/2017 | Ma et al. |
| 2018/0162765 A1 | 6/2018 | Witzmann et al. |
| 2018/0164226 A1 | 6/2018 | Witzmann et al. |
| 2018/0168928 A1 | 6/2018 | Witzmann et al. |
| 2018/0170804 A1 | 6/2018 | Witzmann et al. |
| 2019/0164269 A1 | 5/2019 | Kläger et al. |
| 2020/0002212 A1 | 1/2020 | Maennl |

FOREIGN PATENT DOCUMENTS

| | | |
|---|---|---|
| DE | 4224282 | 1/1994 |
| DE | 19926878 | 12/1999 |
| DE | 10122335 | 7/2002 |
| DE | 10234002 | 2/2004 |
| DE | 10335247 | 2/2005 |
| EP | 0761377 | 6/1999 |
| EP | 2818454 | 12/2014 |
| GB | 2078621 | 1/1982 |
| JP | H04231333 | 8/1992 |
| JP | H06263465 | 9/1994 |
| JP | 2015535794 | 5/2011 |
| JP | 2016528144 | 9/2016 |
| WO | 9910238 | 3/1999 |
| WO | 2004000749 | 12/2003 |
| WO | 2008104688 | 9/2008 |
| WO | 2009116300 | 9/2009 |
| WO | 2009128893 | 10/2009 |
| WO | 2012028611 | 3/2012 |
| WO | 2012046136 | 4/2012 |

* cited by examiner

METHOD FOR MANUFACTURING A GLASS TUBE SEMI-FINISHED PRODUCT OR A HOLLOW GLASS PRODUCT MADE THEREFROM WITH MARKINGS, AND USES OF THE SAME

CROSS-REFERENCE TO RELATED APPLICATIONS

The present application claims priority to German patent application no. 10 2016 125 129.1 "Method for manufacturing a glass tube semi-finished product or a hollow glass product made therefrom with markings, and uses of the same", filed on Dec. 21, 2016, the whole content of which is hereby incorporated by reference.

FIELD OF THE INVENTION

The present invention relates generally to processing of, and improving anti-counterfeit protection of, glass tube semi-finished products, how these are used in particular as starting material for manufacturing hollow glass products made from glass, in particular containers for substances for pharmaceutical, medical or cosmetic applications, such as vials, cartridges or syringe bodies, for example, and hollow glass products manufactured from these. In particular, the present invention relates to an improved method for manufacturing a glass tube semi-finished product or a hollow glass product made therefrom with at least one marking, with which better anti-counterfeit protection and also reliable tracking, for example for the purposes of quality control or quality improvement, can be achieved in a simple manner.

BACKGROUND OF THE INVENTION

Various methods for marking and coding semi-finished or finished products are known from the prior art. However, because of the particular material characteristics and manufacturing conditions of glass, the methods usually used for marking or coding glass involve imprinting markings or the like directly into the glass material.

For example, such a method is disclosed in US 2003 0029849 A1, DE 102 34 002 A1 or WO 2012 028611 A1 of the applicant, the content of which is expressly incorporated herewith by way of reference. In this method the glass is acted upon by a laser pulse in sections to apply a marking to the surface. The marking is clearly visible and in particular can be reliably read by means of a lensing effect exerted by the marking, can be stresslessly applied at high temperatures during manufacture and is therefore suitable for applying the marking during the manufacture of glass tube semi-finished products, that is to say during the tube forming process itself. A particular advantage of this method is that the marking can be applied at temperatures above the transformation temperature of the glass, without the need to return the temperature of the strand of glass tubing to such high temperatures after the actual tube forming process. The method can be used to apply markings for combating product piracy but also to apply brand names, company logos or other product features on the strand of glass tubing.

Further methods for marking glass substrates are disclosed in WO 2004 000749 A1 and WO 2009 128893 A1.

WO 2008 104688 A1 discloses a hollow glass product with a marking formed on it containing details about the production line and place of manufacture, achieved by means of a special numeric coding.

US 2009 0159174 A1 discloses a method for manufacturing a pharmaceutical container, in which an intrinsic and extrinsic coding are applied to the pharmaceutical container, wherein these two codings are correlated with each other in such a way that the container or the pharmaceutical substance to be held by the container can be unambiguously identified by a link between the intrinsic and extrinsic coding. The markings on the containers do not allow any firm conclusions to be drawn about the glass tube or its manufacturer, since said markings do not guarantee complete traceability back to the original glass or to the manufacturer of the original glass.

Counterfeiting persists in the manufacture of glass tubes, which makes enhanced product security difficult. It must also be borne in mind that, particularly in the case of pharmaceutical containers, increasingly rigorous specifications have to be observed regarding not only geometric dimensions, such as internal diameter, wall-thickness, external diameter and related tolerances, for example, but also chemical-physical parameters, such as chemical resistance, ion emissions, etc. In order to increase product security, it is important in particular to improve the information situation regarding origin, specific production conditions etc. during the manufacture of glass tube semi-finished products and during the manufacture of hollow glass products from glass tube semi-finished products.

BRIEF SUMMARY OF THE INVENTION

Accordingly, there exists a need to make further improvements in this area. Notably, there exists a need to provide an improved method for manufacturing a glass tube semi-finished product or a hollow glass product made therefrom with markings and uses of the same, with which improved anti-counterfeit protection and also reliable tracking, for example for the purposes of quality control or quality improvement, can be achieved in a simple manner.

According to a first aspect of the present invention, a method for manufacturing a glass tube semi-finished product is provided, comprising: providing the glass tube semi-finished product with a first marking; and marking the glass tube semi-finished product with a second marking; wherein the first marking contains information regarding origin of the glass tube semi-finished product or information regarding origin and manufacture of the glass tube semi-finished product; and wherein a piece of information of the second marking is linked to a piece of information of the first marking, so as to allow a decision to be made about an originality, in particular an authenticity, or about an origin of the glass tube semi-finished product and/or about the origin of an apparatus with which the first and/or second marking was generated on the glass tube semi-finished product.

In order to determine originality, in particular authenticity, of the glass tube semi-finished product, a computation can be performed using information from the first and second marking, in particular by a comparison, by checking a correct linking of information, by means of a proof total calculated from the information in accordance with a pre-determined calculation rule, or a linking of the datasets themselves can be checked, for example a link or linking of the corresponding datasets in a database, which is operated by the manufacturer of the original glass tube and to which third parties are granted access as appropriate. The link can also take the form of a real-time certificate, which can also be imprinted in a marking in the glass tube.

Parameters or datasets, such as numerical codes, which code a glass tube manufacturer, a serial number generated by said manufacturer, batch numbers, drawing numbers, date of manufacture etc. can be used to determine the origin of the glass tube semi-finished product. Within the meaning of the present invention, these parameters can be supplemented to include further information that tracks the full history of the glass tube semi-finished product. This information can also be contained entirely in the first marking.

The apparatus that generated the first marking on the glass tube semi-finished product can be, in particular, a laser device to apply a marking at temperatures above the transformation temperature of the glass, preferably in the form of a Digital Matrix Code (DMC), using a method such as that disclosed in US 2003 0029849 A1, DE 102 34 002 A1 or WO 2012 028611 A1 of the applicant. Now, in order to prove originality, in particular authenticity, of this apparatus, when applying the first marking said apparatus can also imprint a further piece of information in the glass that makes it possible to identify this apparatus. For example, a serial number of this apparatus can be included in the imprint in the glass tube. By subsequent matching with a database operated by the original manufacturer or a further-processing company, it is possible to determine that this apparatus was entitled or authorized to apply markings on the glass tube semi-finished product. Internal checking procedures may also be performed in this apparatus and provision can be made for the marking on the glass tube to also show that the checking procedures were passed successfully, in order to prove the integrity of this marking apparatus.

The apparatus that generated the first marking on the glass tube semi-finished product can essentially also be a printer or printing stamp, with which the first marking is applied on the outer surface of the glass tube semi-finished product, but this necessarily presupposes a secure supply chain.

According to a further embodiment, the first marking is generated continuously or discontinuously during forming of the tube at predetermined intervals along the longitudinal direction of the glass tube semi-finished product. In particular, these intervals can be matched to the subsequent process steps to be performed for further processing the glass tube semi-finished product. If it is known, for example, that individual segments of a predetermined length are later to be separated from the glass tube semi-finished product to be further processed to produce a hollow glass product, the first markings can be applied at this predetermined distance to each other, in order to ensure that subsequently a first marking is applied to each hollow glass product.

According to a further embodiment, the second marking is generated as a single marking at a predetermined position on the glass tube semi-finished product, which is different from a position of the first marking. This second marking can easily be removed, in particular by a further-processing company, and replaced by a new marking, or can be supplemented there by an additional marking.

According to a further embodiment, the first marking further includes information regarding the dimensions of the glass tube semi-finished product and/or process parameters during the forming of the glass tube semi-finished product.

According to a further embodiment, the first marking is generated at temperatures above a transformation temperature ($T_G$) of the glass of the glass tube semi-finished product. A high level of anti-counterfeit protection is thus guaranteed in a simple manner, since often reheating of hollow glass products to temperatures above the transformation temperature ($T_G$) of the glass is not possible for technical reasons, for example if the hollow glass product is already filled with a substance, or if the hollow glass product was manufactured with such a high degree of precision that it is no longer possible to meet the tolerances after reheating to temperatures above the transformation temperature ($T_G$) of the glass.

According to an alternative embodiment, the second marking is generated at temperatures below a transformation temperature ($T_G$) of the glass of the glass tube semi-finished product, thereby saving considerable processing effort. In particular, the second marking can be formed during separation of the glass tube semi-finished product from a continuous strand of glass tubing following tube forming, in particular during, or as part of, a separating of a plurality of glass tube semi-finished products.

According to a further embodiment, the first and second marking are generated as a combined marking directly adjacent to each other on the glass tube semi-finished product. This allows the markings to be advantageously applied in a space-saving manner and to be read quickly, in particular using the same reading device, without the need to move said reading device to do so.

According to a further embodiment, the second marking is generated during separation of the glass tube semi-finished product from a continuous strand of glass tubing. Since this separation can only be done by the original manufacturer, this therefore guarantees a high level of anti-counterfeit protection.

According to a further aspect of the present invention, a method for manufacturing a hollow glass product from a glass tube semi-finished product is provided, wherein the glass tube semi-finished product is marked with a first marking with information regarding origin of the glass tube semi-finished product and a second marking, the information of which is linked to the information of the first marking, so as to allow a decision to be made about an originality, in particular an authenticity, or origin of the glass tube semi-finished product and/or origin of an apparatus with which the first and/or second marking was generated on the glass tube semi-finished product, comprising: providing the glass tube semi-finished product with the first and the second marking, as described above; further processing the glass tube semi-finished product and thermal forming the glass tube semi-finished product, at least in sections, to form the hollow glass product, at temperatures above a transformation temperature ($T_G$) of the glass of the glass tube semi-finished product; wherein the first and the second marking remain unchanged and are readable on the finished hollow glass product after its manufacture, in order to allow a relevant decision to be made about the originality, in particular authenticity, or about an origin of the glass tube semi-finished product and/or about an origin of an apparatus with which the first and/or second marking was generated on the glass tube semi-finished product. The thermal forming, at least in sections, can for example be thermal forming of only one end portion of the glass tube semi-finished product; this means that the entire glass tube semi-finished product does not necessarily have to be heated to temperatures above a transformation temperature ($T_G$) of the glass.

According to a further aspect of the present invention, a method for manufacturing a hollow glass product from a glass tube semi-finished product is provided, wherein the glass tube semi-finished product is marked with a first marking with information regarding an origin of the glass tube semi-finished product and a second marking, the information of which is linked to the information of the first marking, so as to allow a decision to be made about an originality, in particular an authenticity, or about an origin of the glass tube semi-finished product and/or about an origin of an apparatus with which the first and/or second marking was generated on the glass tube semi-finished product, comprising: providing the glass tube semi-finished product with the first and the second marking, as described above; further processing the glass tube semi-finished product and thermal forming of the glass tube semi-finished product, at least in sections, to form the hollow glass product at temperatures above a transformation temperature ($T_G$) of the glass of the glass tube semi-finished product, wherein the second marking is removed during further processing by thermal forming of the glass tube semi-finished product, at least in sections, and wherein an additional marking is generated on the hollow glass product, so that the first and the additional marking can be read on the finished hollow glass product after its manufacture, wherein a piece of information of the additional marking is linked to a piece of information of the first marking, so as to allow a decision to be made about an originality, in particular an authenticity, or about the origin of the hollow glass product and/or about the origin of an apparatus with which the first marking was generated on the glass tube semi-finished product.

A further aspect of the present invention relates to a hollow glass product made from glass, in particular a container to hold substances for pharmaceutical, medical or cosmetic applications, manufactured by further processing a glass tube semi-finished product, as disclosed above, including thermal forming of the glass tube semi-finished product, performed on the glass tube semi-finished product at least in sections, for example at only one end portion of the glass tube semi-finished product.

A further aspect of the present invention relates to a method for tracking a glass tube semi-finished product, comprising: reading a first piece of information from a first marking provided on the glass tube semi-finished product, as disclosed above; reading a second piece of information from a second marking provided on the glass tube semi-finished product, as disclosed above, determining whether the first and the second piece of information are correctly linked to each other, in order to allow a decision to be made about an originality, in particular an authenticity, or about an origin of the glass tube semi-finished product and/or about an origin of an apparatus with which the first and/or second marking has been generated on the glass tube semi-finished product.

A further aspect of the present invention relates to a corresponding method for tracking a hollow glass product manufactured by further processing a glass tube semi-finished product including thermal forming of said glass tube semi-finished product, at least in sections.

A further aspect of the present invention relates to a corresponding device for tracking a glass tube semi-finished product or hollow glass product manufactured by further processing a glass tube semi-finished product including thermal forming of said glass tube semi-finished product, at least in sections, wherein the device is configured to execute the above-mentioned method, as disclosed below.

A further aspect of the present invention relates to a corresponding computer program product for executing the above-mentioned method.

BRIEF DESCRIPTION OF THE DRAWINGS

The invention will be described in the following in an exemplary manner and with reference to the appended drawings, from which will ensue further features, advantages and objects to be achieved. The figures show.

Identical reference numerals in the Figures indicate identical elements or element groups or those with substantially the same effect.

DETAILED DESCRIPTION OF THE INVENTION

Figure 1A:
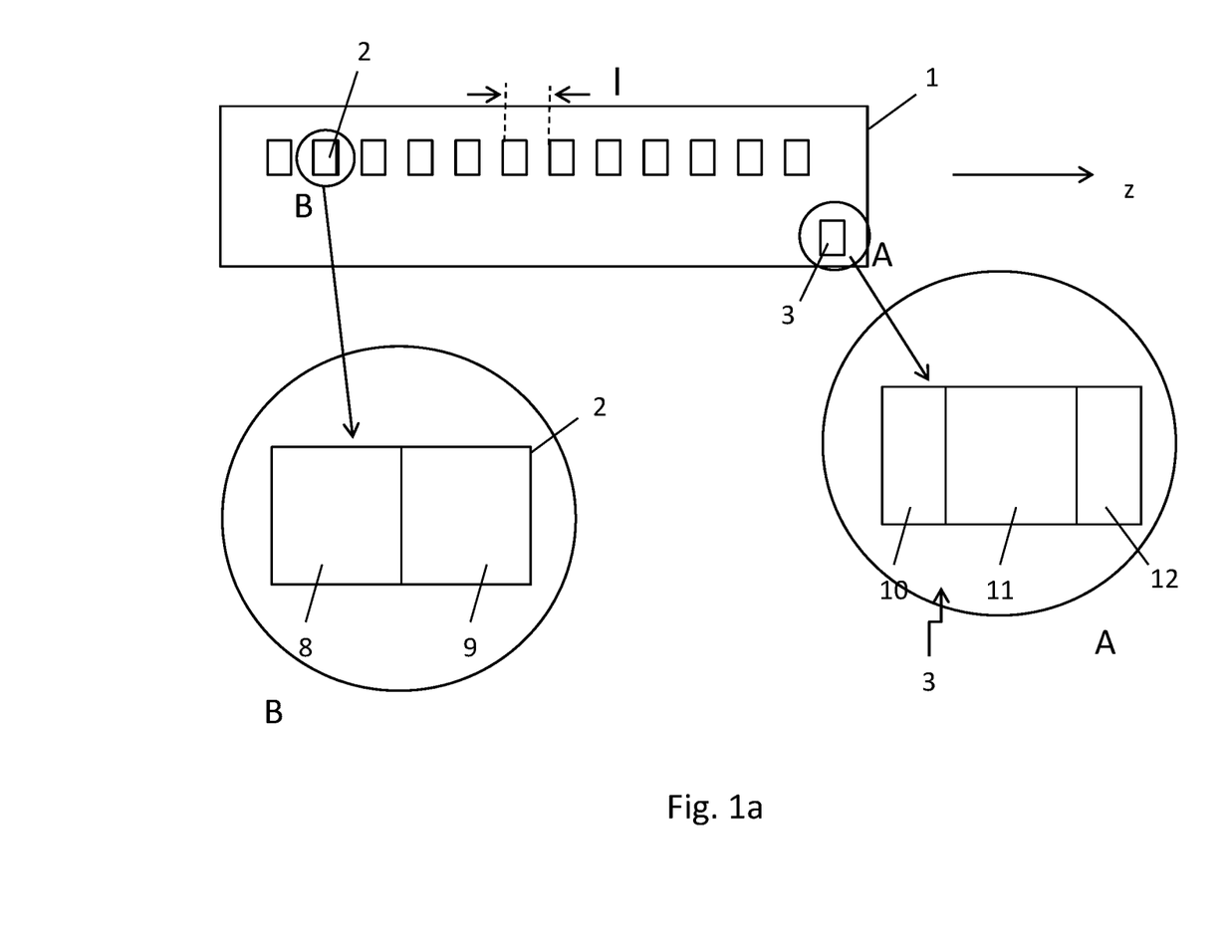
FIG. 1a a first exemplary embodiment of a glass tube semi-finished product according to the present invention with an enlarged view of markings provided thereon.

FIG. 1a shows a first exemplary embodiment of a glass tube semi-finished product according to the present invention with an enlarged view of markings provided thereon. To manufacture the glass tube semi-finished product 1, a tube strand marking 2 ("first marking") is continuously applied on the glass tubing strand, said marking containing a first piece of information 8. According to the invention, this first piece of information 8 contains information, which in conjunction with a further piece of information ("second marking", as described below) provided at another position on the glass tube semi-finished product, preferably indicates details about the manufacturer, place of production and/or production plant of the glass tube 1 and, according to the invention, is retained unaltered right through to the hollow glass product (e.g. pharmaceutical container). These details about manufacturer, place of production and/or production plant of the glass tube 1 can be written uncoded in the first piece of information 8, but can essentially also be coded and are then not readable in plain text but only readable in accordance with a predetermined computation rule or decoding rule.

According to FIG. 1a, the tube strand markings 2 are applied on the glass tube semi-finished product 1 along the longitudinal direction (z) of the glass tube semi-finished product 1 preferably at predetermined constant intervals (1) from each other. These intervals 1 can, for example, be matched to the envisaged length of those sections from which the hollow glass products (for example pharmaceutical containers) are subsequently to be manufactured and have to be cut to size from an original glass tube semi-finished product for this purpose, including any wastage or any sections to be cut off.

Expediently the tube strand marking 2 additionally contains at least one second piece of information 9, which subsequently provides traceability of a section of glass tube semi-finished product cut from the glass tube semi-finished product 1 or the hollow glass product (for example pharmaceutical container) subsequently manufactured therefrom. This second piece of information 9 can in particular be data relating to batch number, tube strand number, a serial number of a glass tube semi-finished product separated from the tube strand, manufacturing time. The second piece of information 9 can contain additional information, for example concerning geometric dimensions in the respective sections of the tube strand markings 2, such as, e.g. external diameter, internal diameter, wall-thickness, ovality, radius of curvature, etc. These geometric data can be determined directly following tube forming by means of an in-line measurement and marked on the tube strand, but can also essentially be determined after separation of glass tube semi-finished products from the tube strand and marked on the tube strand.

It is also possible that the above-mentioned additional information of the tube strand markings 2, for example regarding geometric dimensions in the respective sections of the glass tube strand, such as, e.g. external diameter, internal diameter, wall-thickness, ovality, radius of curvature, etc., only become readable by combining the second piece of information 9, as described above, with information from a second marking 3, as described below, in particular in accordance with a predetermined computation rule or decoding rule.

The method used for marking is also chosen as a function of the time of application of the tube strand marking 2. Thus, it can suffice for the tube strand marking to be applied at temperatures below a transformation temperature of the glass, for example by means of laser marking. However, the tube strand marking 2 is preferably applied at temperatures above the transformation temperature of the glass, preferably in the form of a digital or binary coded code, for example by means of a method such as that disclosed in US 2003 0029849 A1, DE 102 34 002 A1 or WO 2012 028611 A1 of the applicant, the content of which is expressly incorporated herewith by way of reference. The above-mentioned data can thereby be applied in plain text or using a predetermined coding.

According to FIG. 1*a*, at least one second marking 3 is provided at a suitable position on each glass tube semi-finished product 1, for example at a respective beginning or end of a glass tube semi-finished product 1. This second marking 3 contains at least a first piece of information 10. This first piece of information 10 preferably contains details about the manufacturer, place of production and/or production plant of the glass tube 1. These details can be applied in plain text but are preferably imprinted in coded form.

According to FIG. 1*a*, the second marking 3 preferably contains further information as follows: a second piece of information 11 with information, which, in combination with a further piece of information, which can be either the tube strand marking 2 (or a section hereof) or the above-mentioned first piece of information 10, indicates details about manufacturer, place of production and/or production plant of the glass tube 1. However, these details about manufacturer, place of production and/or production plant of the glass tube 1 are not readable in plain text from the second piece of information 11 but rather only in accordance with a predetermined computation rule or decoding rule and in conjunction with the above-mentioned further information and, in this way, can contribute to greater anti-counterfeit protection and product quality.

According to FIG. 1*a*, the second marking 3 can additionally contain at least a third piece of information 12, that allows conclusions to be drawn about which apparatus was used to generate the first marking 2 (tube strand marking) and/or the second marking 3 on the glass tube semi-finished product 1. For example, this might be a serial number, type designation, etc. of such an apparatus, which has been made available by the original manufacturer of the glass tube semi-finished product 1 or from an equipment manufacturer authorized to do so by said original manufacturer. This information can also be additionally certified by an external service provider, for example a test agency. This information may be readable in plain text but is preferably readable in accordance with a predetermined computation rule or decoding rule.

The second marking 3 is preferably applied at temperatures below the transformation temperature of the glass, so that the first marking remains intact and also the geometric characteristics of the glass tube semi-finished product 1 are not further influenced. To this end, the second marking can in particular be generated by imprinting or stamping, of a barcode for example. Other optional marking methods whereby a marking can be applied at temperatures below the transformation temperature of the glass can be used for this purpose. The above-mentioned data can thereby be applied in plain text or using a predetermined coding.

Figure 3:
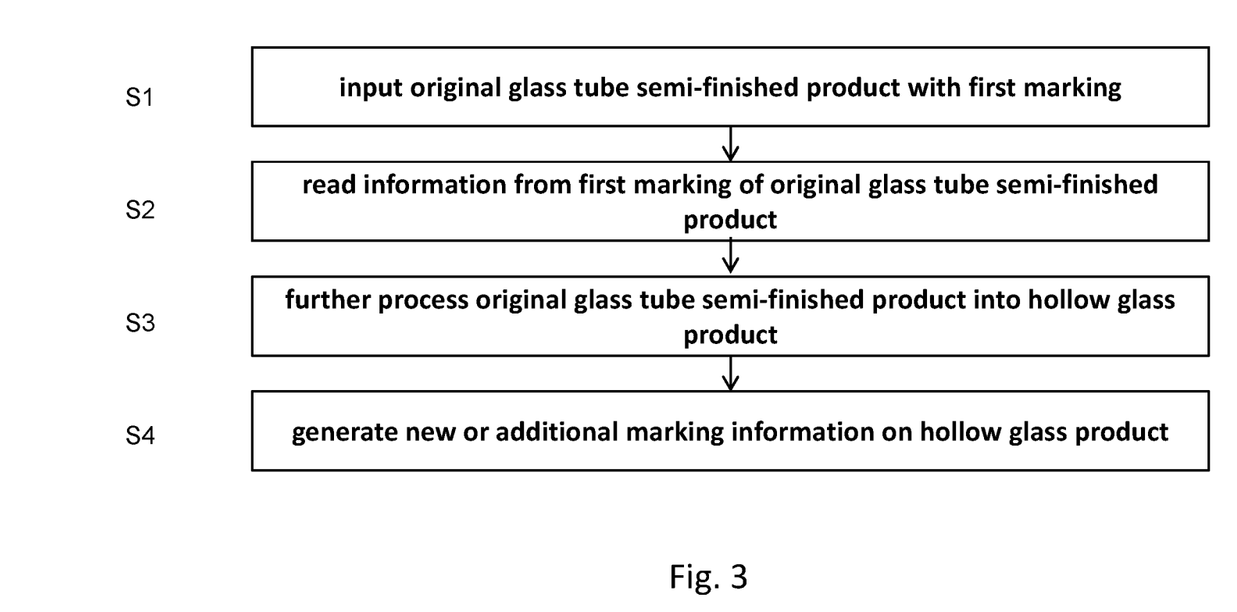
FIG. 3 a schematic flow diagram of a method for manufacturing a hollow glass product according to the present invention that is manufactured by further processing a glass tube semi-finished product including thermal forming of said glass tube semi-finished product, at least in sections.

While, according to the invention, the tube strand marking 2 remains unchanged through to the hollow glass product (pharmaceutical container, for example), the second marking 3 can be removed by a further-processing company during further processing of the glass tube semi-finished product 1 to form the hollow glass product and replaced by another second marking ("new marking") in accordance with a predetermined computation rule or coding rule and while retaining the informational content of the second marking 3 relating to traceability of the glass tube semi-finished product, as described in detail below with reference to FIG. 3.

Figure 1B:
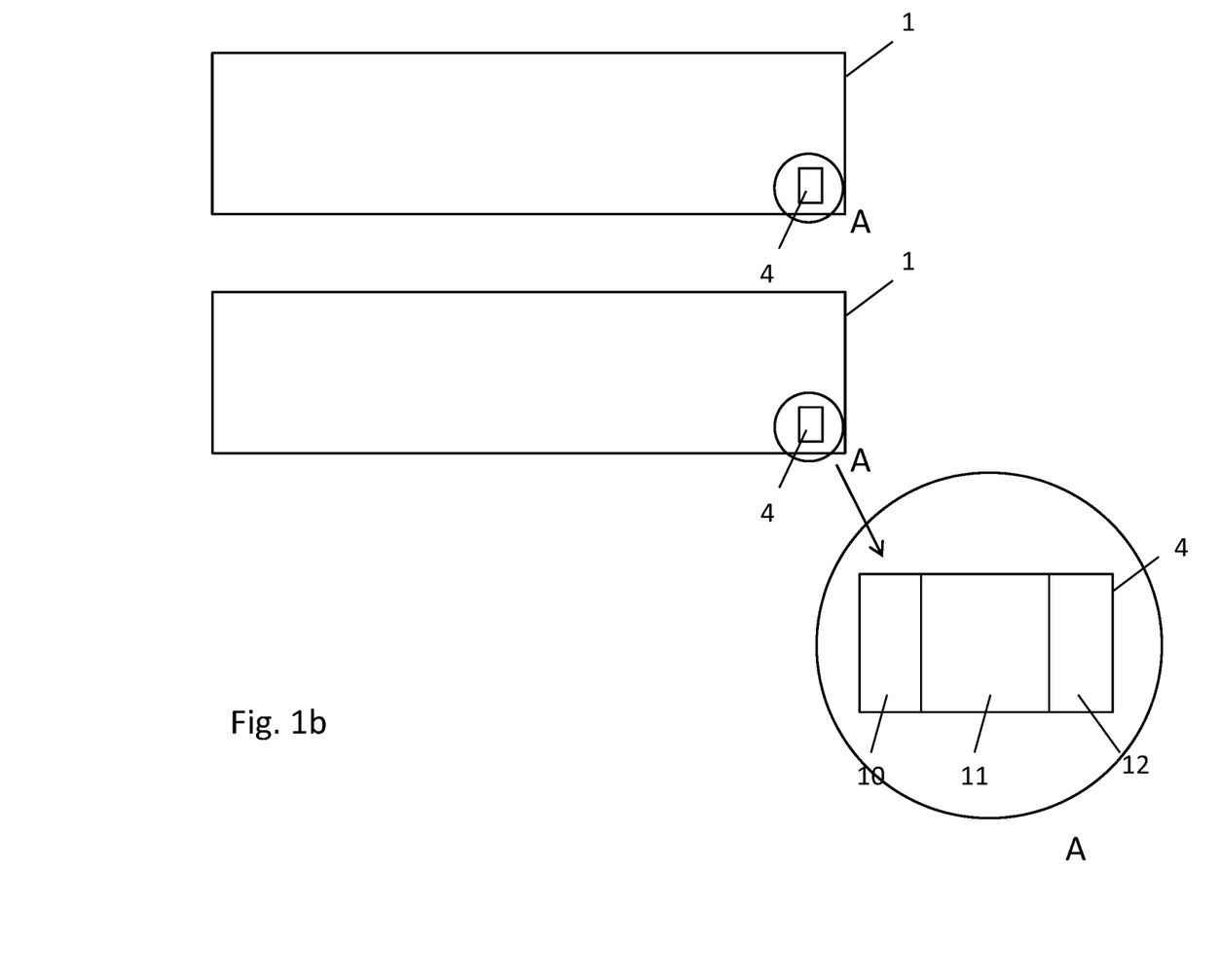
FIG. 1b a second exemplary embodiment of glass tube semi-finished products according to the present invention with an enlarged view of a marking provided thereon.

FIG. 1*b* shows a second exemplary embodiment of a glass tube semi-finished product according to the present invention with an enlarged view of a marking provided thereon. The figure specifically shows two glass tube semi-finished products 1 after they have been cut to length from the continuous strand of glass tubing and after their separation. According to FIG. 1*b*, instead of the spatially separated first and second marking applied at a predetermined position on the glass tube semi-finished product, for example at a beginning or end of the glass tube semi-finished product 1, a combination marking 4 is provided, which contains at least a first and a second piece of information 10, 11, which are arranged in the immediate vicinity of each other and linked in such a manner in order to allow, in an appropriate way and as described above with reference to FIG. 1*a*, a decision to be made about an originality, in particular an authenticity, or about an origin of the glass tube semi-finished product 1 and/or about an origin of an apparatus with which the first and/or second marking was generated on the glass tube semi-finished product 1. Expediently at least one third piece of information 12 is provided in the combination marking 4. The sub-sections 10-12 of the combination marking 4 can be applied together in a single marking step or also expediently one after the other in separate marking steps.

Figure 2A:
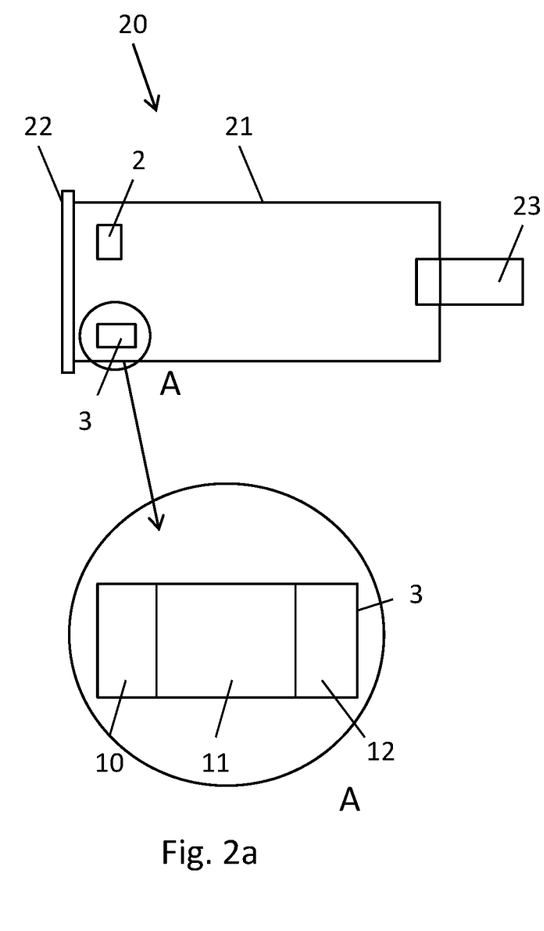
FIG. 2a a first exemplary embodiment of a hollow glass product manufactured from a glass tube semi-finished product according to the present invention with an enlarged view of markings provided thereon.

FIG. 2a shows a first exemplary embodiment of a hollow glass product that was manufactured from a glass tube semi-finished product, as described above. The hollow glass product is a pharmaceutical container 20 in the form of a hollow cylindrical syringe body 21 with a flange 22 and a discharge opening 23. According to FIG. 2a, a first marking 2 and a second marking 3 are applied on the syringe body 21, expediently at positions spaced apart from each other. According to the invention, the information of the first and second marking are linked to each other in such a way as to allow a decision to be made about an originality, in particular an authenticity, or about the origin of the hollow glass product 20 and/or about the origin of an apparatus with which the first and/or second marking has been generated on the glass tube semi-finished product 1, from which the hollow glass product 20 was manufactured by further processing, in particular by further processing that includes a thermal forming, performed at least in sections, in particular at temperatures above the transformation temperature of the glass, as described above.

Figure 2B:
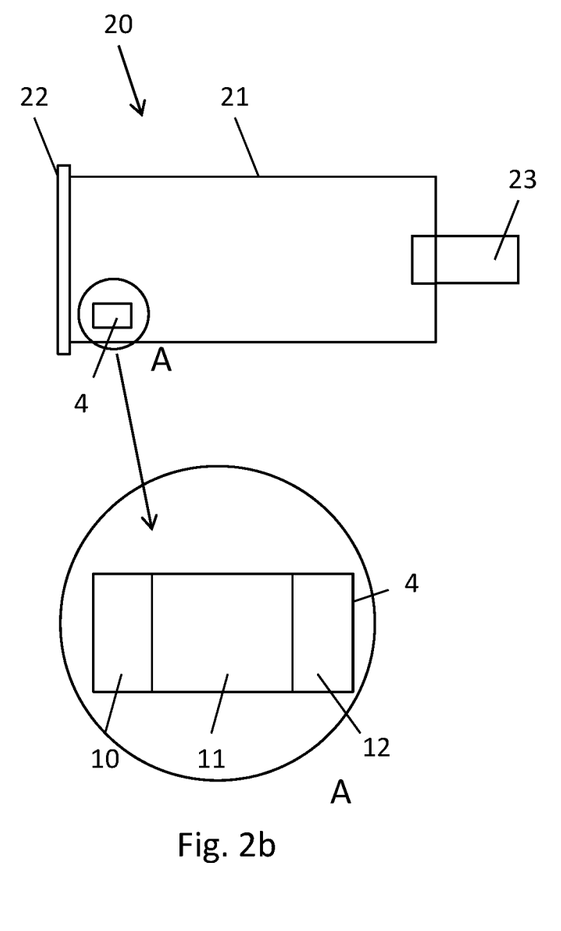
FIG. 2b a second exemplary embodiment of a hollow glass product manufactured from a glass tube semi-finished product according to the present invention with an enlarged view of a marking provided thereon.

FIG. 2b shows a further exemplary embodiment of such a hollow glass product manufactured from a glass tube semi-finished product, wherein, instead of the first and second marking, as shown in FIG. 2a, a combination marking 4 is provided, as described above with reference to FIG. 1b.

FIG. 3 shows a schematic flow diagram of a method for manufacturing a hollow glass product according to the present invention that has been manufactured by further processing a glass tube semi-finished product including thermal forming of said glass tube semi-finished product, at least in sections, in particular at temperatures above the transformation temperature of the glass. For example, the glass tube semi-finished product can be sufficiently heated at one end and then thermally formed in this region. This method is preferably executed by a further-processing company, which obtains original glass tube semi-finished products from an original manufacturer and further processes these into desired hollow glass products. A preferred example of such hollow glass products, which, within the meaning of the present invention, are manufactured from original glass tube semi-finished product, are containers for substances for pharmaceutical, medical or also cosmetic applications.

In step S1, a glass tube semi-finished product, as described above with reference to FIGS. 1a and 1b, is first of all fed into the process to be further processed. The original glass tube is thereby provided with a first marking, in particular a combination marking, as described above with reference to FIG. 1b. Two markings are preferably provided on the original glass tube, in particular a tube strand marking 2 applied continuously or at predetermined intervals from each other and a second marking 3 (cf. FIG. 1a), which is preferably provided at only one predetermined position.

The information of the marking(s) is then read in the step S2 and is available for further processing. A prerequisite for this is that the further-processing company is aware of all relevant information and specifications, knows how to read the marking(s) from the original glass tube and how to further process it/them, for example for the purpose of decoding or recoding in order to apply a new or additional marking in step S4. For this it is also essentially possible that the relevant facilities at the further-processing company, in particular a device for reading the marking(s) and a device for applying a new or additional marking in step S4, are connected via a network, for example the Internet, preferably via a secure connection with encryption, with a central processor or database of the manufacturer of the original glass tubes.

During further processing of the original glass tube semi-finished product by the further-processing company, after the relevant information has been read out, the second marking 3 (cf. FIG. 1a) or at least a portion of the combination marking 4 (cf. FIG. 1b) can be removed, for example by cutting off an end section of the original glass tube semi-finished product bearing the second marking 3, or made unreadable in a suitable way, for example by overwriting with relevant information or marking with blank information. The manufacturer of the original glass tube semi-finished products can be notified of this, for example in order to update a database operated by the manufacturer with relevant information about all glass tube semi-finished products manufactured by said manufacturer.

The further processing of the original glass tube semi-finished product can, in particular, include thermal forming in sections at temperatures above the transformation temperature of the glass. During this process, while the glass is still soft from heating, a new or additional piece of information can be applied to the transformed hollow glass product in step S4, preferably in the form of a Digital Matrix Code (DMC), for example by means of a method such as that disclosed in US 2003 0029849 A1, DE 102 34 002 A1 or WO 2012 028611 A1 of the applicant, the content of which is expressly incorporated herewith by way of reference. The above-mentioned data can thereby be applied in plain text or using a predetermined coding.

Within the meaning of the present invention, provision can be made for the further-processing company to measure and record relevant process parameters during further processing of the original glass tube semi-finished product to form the hollow glass product. This information can be incorporated in the generation of the new or additional marking on the hollow glass product, whether this be that the relevant process parameters are directly included in the new or additional marking, or a corresponding link to the associated datasets in a database operated by the further-processing company, to which the original manufacturer of the original glass tubes and the further-processing company have access, but possibly also other parties, such as, e.g. certification service providers, is incorporated in the new or additional marking.

In order to generate the new or additional marking on the hollow glass product, the relevant pieces of information read from the first and/or second marking of the original glass product are linked to each other in such a way as to allow a decision to be made about an originality, in particular an authenticity, or about the origin of the original glass tube, from which the hollow glass product was manufactured, and/or about the origin of an apparatus with which the first and/or second marking was generated on this original glass tube. In particular, this should provide complete traceability of all relevant information of the original glass tube in question or of the corresponding section thereof, from which the respective hollow glass product has been manufactured. In other words: according to the invention it is possible to have a full history of the relevant data of the original glass tube or of a corresponding section hereof right through to the hollow glass product, thereby achieving not only a high level of anti-counterfeit protection but also complete traceability of all relevant parameters of the original glass product or the corresponding section hereof, for the purposes of quality control and optimization of logistical or further processing steps.

In this way, all relevant original characteristics (manufacturer, serial number, glass melt, tube drawing, etc.) can be marked during tube forming of the endless strand of tubing. This marking is combined with an additional marking during separation of the tube. According to the invention, the marking on the separated glass tube is combined with the tube strand marking in such a manner that any falsification on the individual tube would immediately be detected. The tube strand marking is retained right through to the hollow glass product. If the further-processing company receives an original glass tube that is continuously marked and in particular includes an additional marking (e.g. DMC), it is subsequently possible to check unequivocally whether the individual marking on the glass tube comes from the original manufacturer of the glass tube or indicates counterfeiting in the supply chain.

Coding or marking of the hollow glass product by the further-processing company also allows e.g. the consumer to check the authenticity of the hollow glass product on the hollow glass product, hence of pharmaceutical containers, for example, namely by the coding of the further-processing company being suitably linked with the marking(s) of the original manufacturer, so, for example, containing a link to a tube code of the original glass tube. Since the continuous marking of the original glass tubes requires temperatures above the transformation temperature ($T_G$) of the glass, falsification in subsequent process steps is extremely complicated, if not completely impossible, for example after filling of a pharmaceutical container with a pharmaceutical substance. The code combination proposed by the invention hence provides a high level of protection against counterfeiting. At the same time, it is also possible to track the relevant manufacturing and process parameters right back to the source, i.e. to the original glass tube, which provides significant advantages in terms of quality assurance. This means that important information is subsequently available for complaints or damage assessments.

The above-mentioned logical linking of the relevant information by the further-processing company and generation of a new or additional marking makes it possible to track the history of the material from the manufacture of the original glass tube, from which the hollow glass product has been manufactured, right through to the hollow glass product itself.

Figure 4:
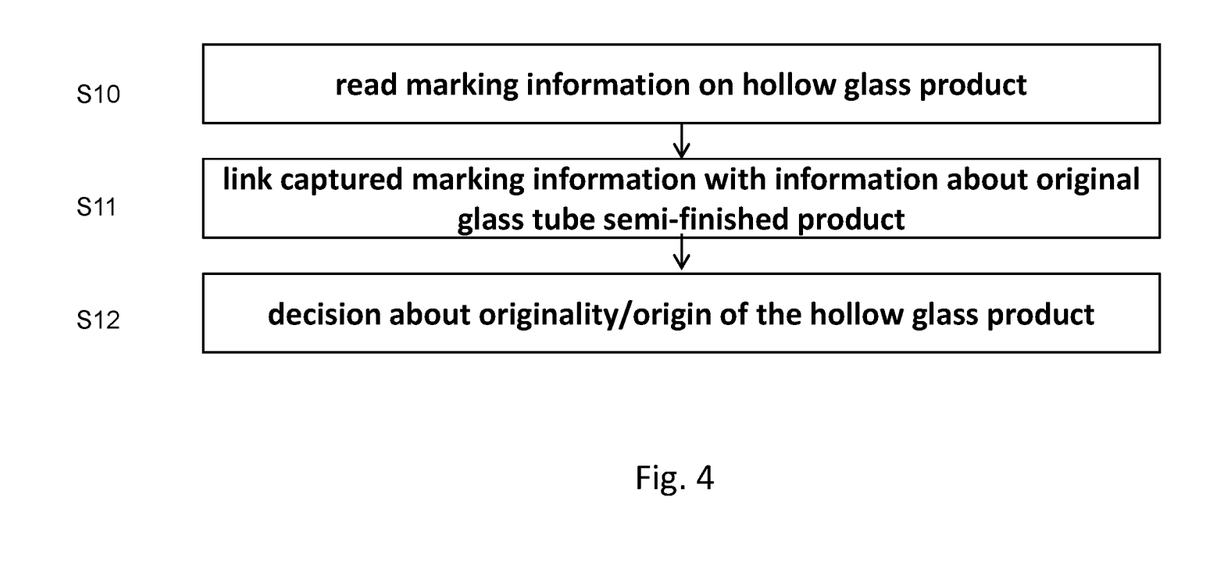
FIG. 4 a schematic flow diagram of a method for tracking a hollow glass product according to the present invention that is manufactured by further processing a glass tube semi-finished product including thermal forming of said glass tube semi-finished product.

FIG. 4 shows a schematic flow diagram of a method for tracking a hollow glass product according to the present invention that has been manufactured by further processing a glass tube semi-finished product including thermal forming of said glass tube semi-finished product. This method can be executed in particular by a consumer but also for the purposes of quality control and quality assurance. To do this, in step S10, information is read from the at least one marking on the hollow glass product, that is to say, according to FIG. 2a, from the first and second marking 2, 3 or, according to FIG. 2b, from the applied combination marking 4. In step S11, this captured information is linked with further information about the original glass tube, in order to allow a decision to be made on the basis of the link in Step S12 about an originality, in particular an authenticity, or origin of the glass tube semi-finished product from which the hollow glass product has been manufactured, and/or of an apparatus with which the first and/or second marking has been generated on the glass tube semi-finished product. For this purpose, access can be provided to a database that is operated by the manufacturer of the original glass tube and/or by the further-processing company. This access can be via a network, for example a company network or the Internet, wherein secure connections including an encryption are preferably used.

Figure 5:
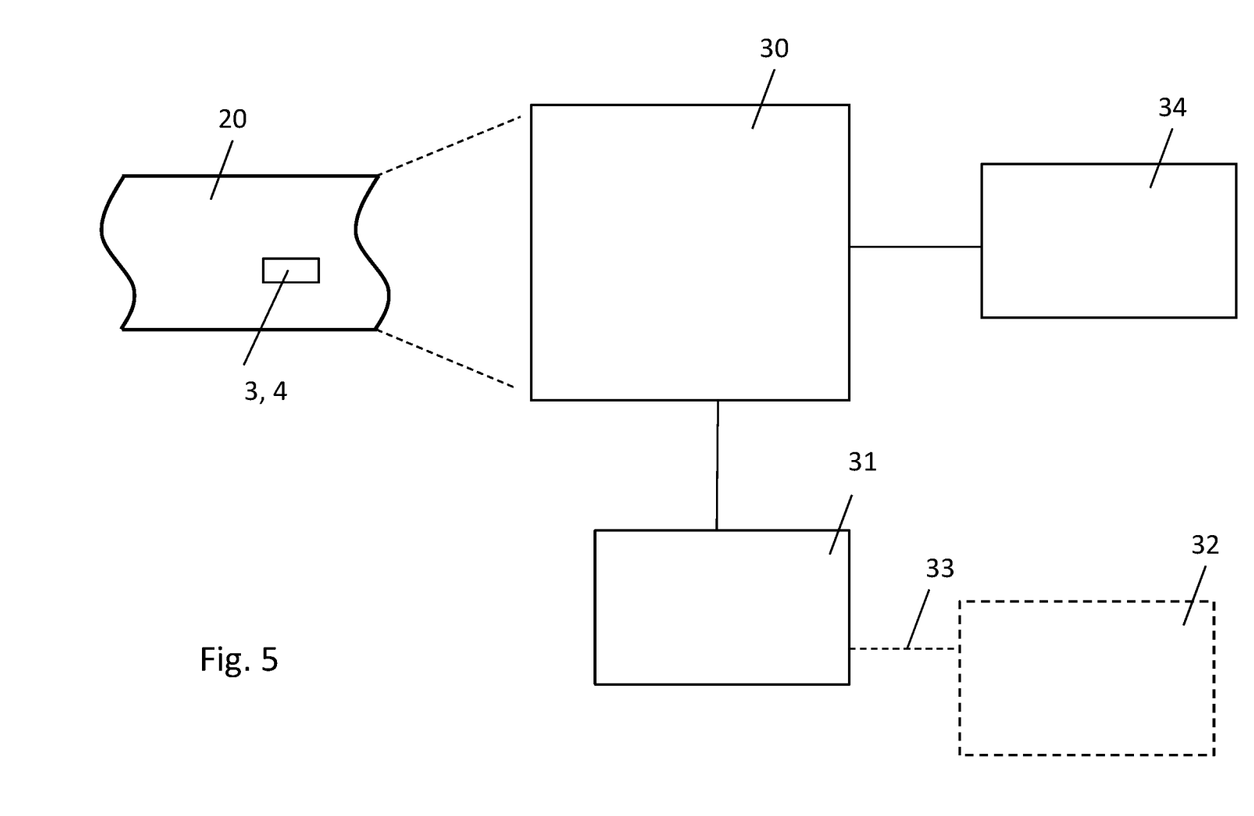
FIG. 5 a schematic diagram of an apparatus for determining the authenticity or for tracking a hollow glass product according to the present invention that is manufactured by further processing a glass tube semi-finished product including thermal forming of said glass tube semi-finished product.

FIG. 5 shows a schematic diagram of a device for determining the authenticity of a glass tube semi-finished product or for tracking a hollow glass product according to the present invention that has been manufactured by further processing a glass tube semi-finished product including thermal forming of said glass tube semi-finished product. According to FIG. 5, a detection device 30, which reads at least one marking 3 or 4 on the hollow glass product (or on a glass tube semi-finished product) is provided. In the case of a Digital Matrix Code (DMC), optical reading methods can be employed for this, such as the method disclosed in US 2003 0029849 A1, DE 102 34 002 A1 or WO 2012 028611 A1 of the applicant, which is executed under the control of a control device 34, in particular a processor. For this purpose, there can be access to an internal database 31, in which relevant data are stored, which allows a conclusion to be drawn about an originality or tracking of the hollow glass product 20 back to the glass tube semi-finished product, from which said hollow glass product was manufactured. These relevant data can also be stored in an external database 32, which is operated, for example, by an original manufacturer of glass tubes or by a certified further-processing company. The access to this external database 32 can be via a network, for example a company network or the Internet, wherein secure connections including an encryption are preferred.

The control can also take place via a control device 34, which is operated by an original manufacturer of glass tubes or by a certified further-processing company. To this end, data communication can take place via a network, for example a company network or the Internet, wherein secure connections, including an encryption, are preferred.

Figure 6A:
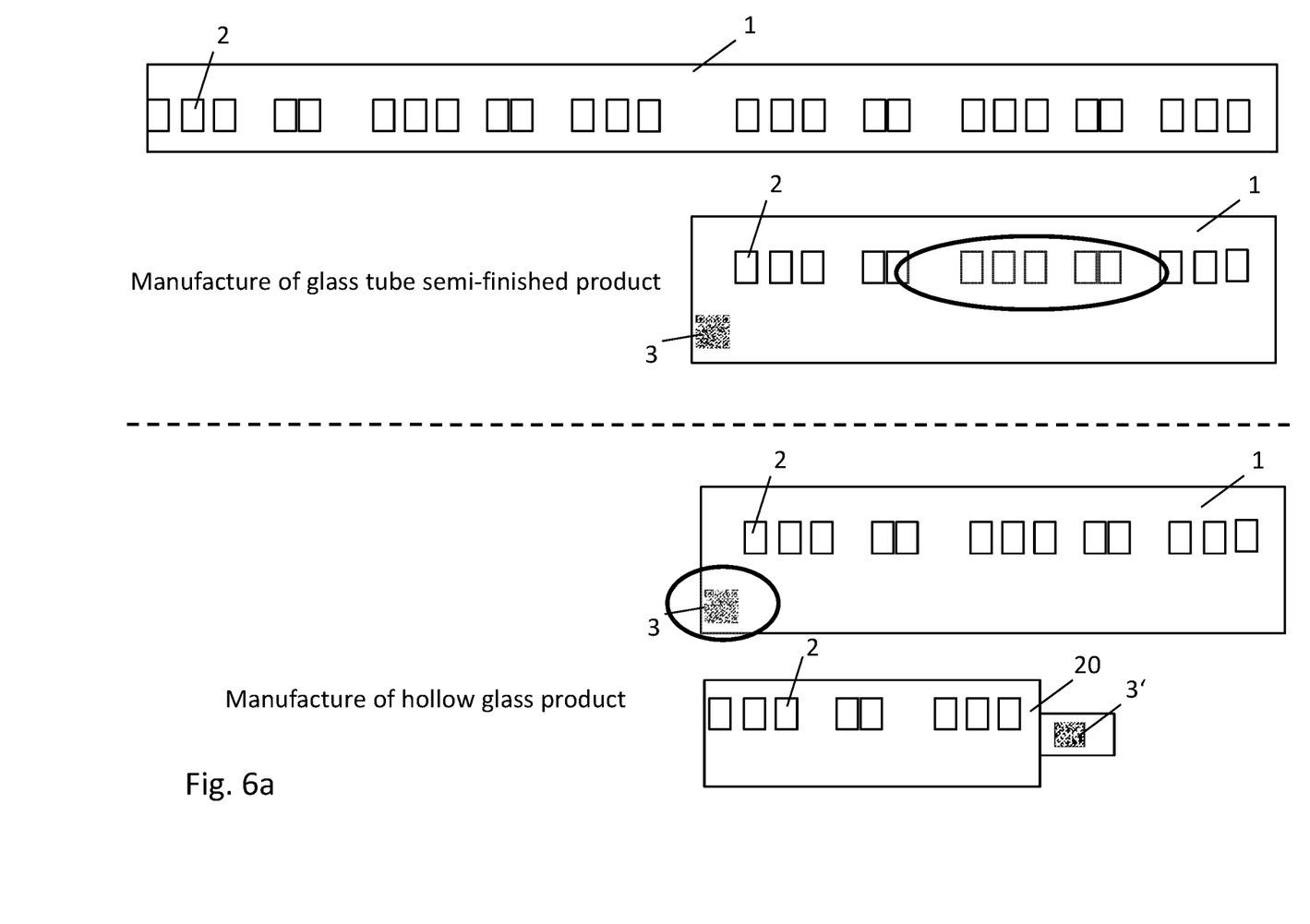
FIG. 6a schematically summarizes the markings provided on a glass tube semi-finished product in various stages of further processing.

FIG. 6a schematically summarizes the markings provided on a glass tube semi-finished product in various stages of further processing. The top part of the figure first of all shows a continuous tube strand 1 directly after tube forming. This tube strand 1 exhibits a plurality of tube strand markings 2, as described above. Glass tube semi-finished products 1 are cut to a predetermined length from this tube strand 1 by the glass tube manufacturer, for example a length of 1.5 m. As is further shown in FIG. 6a, during cutting to length of the glass tube semi-finished product 1, an additional marking 3 is generated at a predetermined position of the glass tube semi-finished product 1, for example at a back end. The information of the additional marking 3 is linked in a suitable manner to the information of the tube strand marking, so as to allow a decision to be made about an originality, in particular an authenticity, or about an origin of the glass tube semi-finished product 1 and/or about the origin of an apparatus with which the tube strand marking 2 and/or about the additional marking 3 was generated on the glass tube semi-finished product 1. The relevant data during manufacture of the glass tube semi-finished product 1 are also stored in a database of the glass tube manufacturer in one-to-one correlation with the respective glass tube semi-finished product 1. An authorized further-processing company and/or a filling company can access this database.

The bottom part of FIG. 6a shows the steps performed by a further-processing company. The glass tube semi-finished product 1 is first of all taken out of a transport packaging. During this process the pieces of information from the tube strand marking 2 and the additional marking 3 are read and further processed. The glass tube semi-finished product 1 is then further processed, namely in accordance with FIG. 6a to form a hollow glass product 20, for example a syringe body, vial or the like. As shown in FIG. 6a, after it has been read, the additional marking 3 is removed during further processing of the glass tube semi-finished product 1, for example by cutting the section bearing the additional marking off the glass tube semi-finished product. The information read from the additional marking 3 is used to generate a new marking 3', which is linked in the manner described above to the information of the tube strand marking 2, so as to allow a decision to be made about an originality, in particular an authenticity, or about an origin of the glass tube semi-finished product 1 and/or about the origin of an apparatus with which the first and/or second marking was generated on the glass tube semi-finished product 1.

Figure 6B:
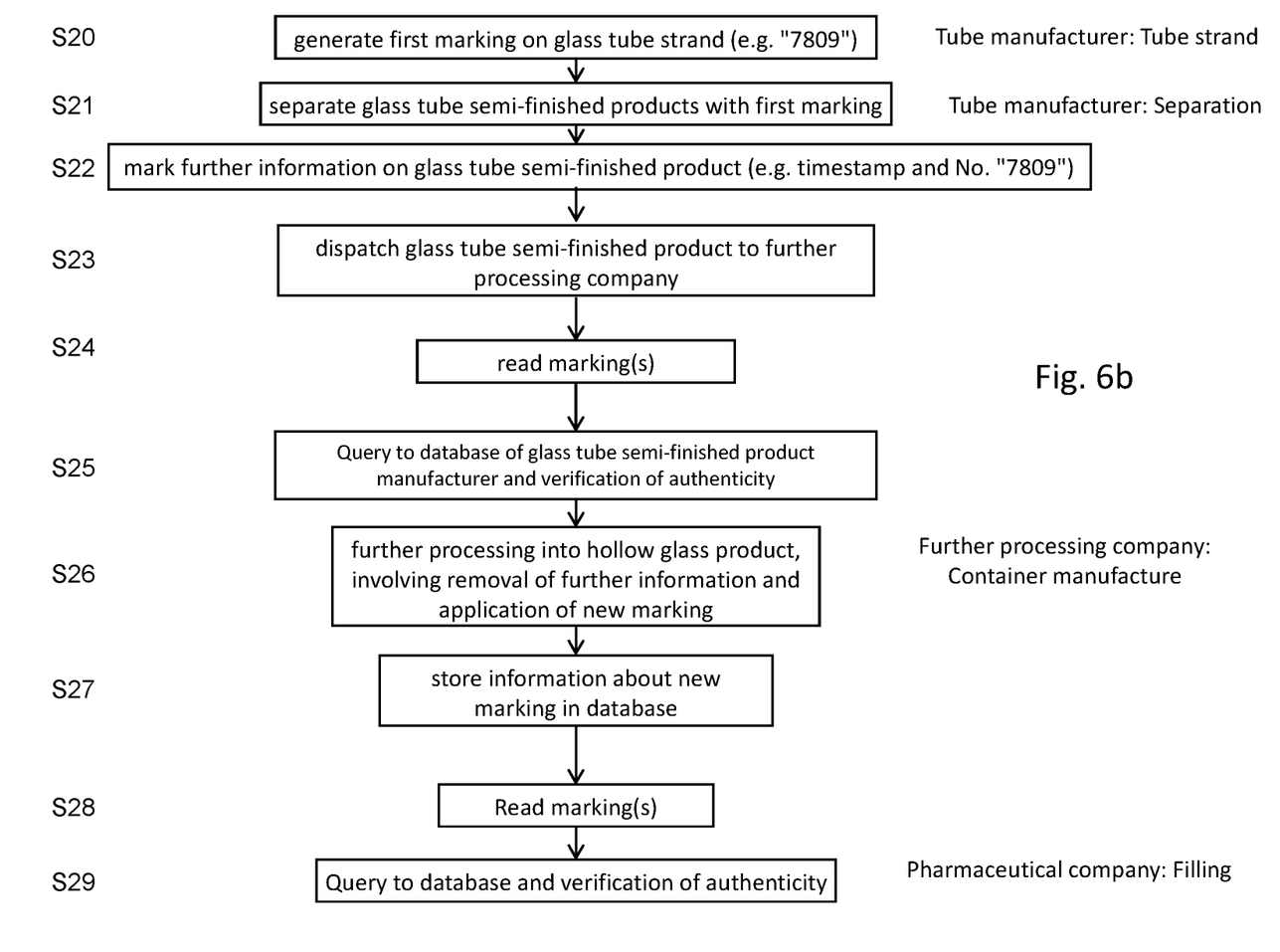
FIG. 6b a schematic flow diagram of the various stages of further processing of a glass tube semi-finished product into a pharmaceutical packaging and its further processing.

FIG. 6b shows a schematic flow diagram of the various stages of further processing of a glass tube semi-finished product into a pharmaceutical packaging and its further processing. First of all, the manufacturer of the glass tube semi-finished product generates a first marking on the continuous glass tubing strand in step S20, for example a serial number ("7809"). During cutting to length and separation of the glass tube semi-finished product in step S21, the cut-to-length glass tube semi-finished product is marked with a further piece of information in step S22, in the illustrated example with a timestamp for the separation of the glass tube semi-finished product.

Following step S22 and further packaging, the glass tube semi-finished product is dispatched to a further-processing company (step S23). After unpacking the glass tube semi-finished product, the latter reads the marking(s) on the glass tube semi-finished product (step S24). This information is used in step S25 to verify the authenticity/originality of the glass tube semi-finished product by interrogating the manufacturer's database. If this verification is successful, the glass tube semi-finished product is further processed to form a hollow glass product (step S26). During this process, the additional marking is removed after its information has been read, while the first marking, which was preferably generated at temperatures above the transformation temperature of the glass, is not changed. A new marking is then applied to the hollow glass product, as described above with reference to FIG. 6a. The information of the new marking is linked in the manner described above to the information of the tube strand marking (first marking), so as to allow a decision to be made about an originality, in particular an authenticity, or about an origin of the glass tube semi-finished product 1 and/or about the origin of an apparatus with which the first and/or second marking was generated on the glass tube semi-finished product 1. In the step S27 the relevant pieces of information required for this are also stored in a database, which can also essentially be the database of the manufacturer of the glass tube semi-finished product.

After step S27 the hollow glass products are dispatched to a pharmaceutical company where they are filled. To do this the pharmaceutical company first of all reads the markings on the hollow glass product (step S28), in order to verify an authenticity/originality of the hollow glass product. To this end the pharmaceutical company interrogates a database, in order to verify the authenticity/originality of the hollow glass product (step S29). Further useful information can be determined from the additional marking and relayed to the pharmaceutical company. This information can in particular relate to information that was determined during further processing of the glass tube semi-finished product to form the hollow glass product, for example geometric variables of the hollow glass product, such as internal diameter, external diameter, wall-thickness, lengths, variations in these variables etc. These parameters can then be used by the pharmaceutical company to control filling of the hollow glass products in an appropriate manner.

As will be apparent to the person skilled in the art, the present invention is also directed to further embodiments as disclosed hereinafter:

Embodiment A

A device for tracking a glass tube semi-finished product (1), in particular a glass tube semi-finished product (1) according to claim 16, manufactured by further processing a glass tube semi-finished product (1), including thermal forming of the glass tube semi-finished product (1), at least in sections, comprising:
 a detection device (30) for reading a first piece of information from a first marking (2; 10), which is provided on the glass tube semi-finished product (1) or hollow glass product (20), and for reading a second piece of information from a second marking (3; 11), which is provided on the glass tube semi-finished product (1) or hollow glass product (20);
 a processor device (34), which is configured to determine whether the first and the second piece of information are correctly linked to each other, in order to allow a decision to be made about an originality, in particular an authenticity, or an origin of the glass tube semi-finished product (1) or hollow glass product (20) and/or an origin of an apparatus with which the first and/or second marking has been generated on the glass tube semi-finished product (1).

Embodiment B

A computer program product comprising software code segments, which, when read into a processor device (34), cause said processor device to execute the method according to any of claims 18 to 24, in order to allow a decision to be made about an originality, in particular an authenticity, or an origin of the glass tube semi-finished product (1) or the hollow glass product (20) and/or an origin of an apparatus with which the first marking (2; 10) has been generated on the glass tube semi-finished product (1).

LIST OF REFERENCE NUMERALS 1 glass tube or glass tube semi-finished product
2 tubing strand marking
3 marking
3' marking
4 combination marking
8 first piece of information
9 second piece of information
10 first section
11 second section
12 third section
20 glass tube semi-finished product/hollow glass product/pharmaceutical container
21 syringe body
22 flange
23 discharge opening
30 detection device
31 internal database
32 external database
33 network
34 processor device/control device 1 predetermined interval
Z longitudinal direction

What is claimed is:

1. A method for manufacturing a glass tube semi-finished product with an apparatus, the method comprising:
providing the glass tube semi-finished product with a first marking at a first location, wherein the first marking includes information regarding at least one of origin and manufacture of the glass tube semi-finished product; and
marking the glass tube semi-finished product during formation thereof with the apparatus with a second marking at a second location, wherein the second marking includes a piece of information linked with a piece of information of the first marking;
wherein the linked pieces of information enable a determination regarding at least one of authenticity of the glass tube semi-finished product, origin of the glass tube semi-finished product, and origin of the apparatus, and wherein the first marking and the second marking were generated on the glass tube semi-finished product during formation.

2. The method according to claim 1, wherein the first marking is generated continuously or discontinuously during forming of a glass tube, which is used for forming the glass tube semi-finished product, at predetermined intervals along the longitudinal direction of the glass tube semi-finished product.

3. The method according to claim 1, wherein the first marking further includes information regarding at least one of (i) dimensions of the glass tube semi-finished product and (ii) process parameters during forming of the glass tube semi-finished product.

4. The method according to claim 1, wherein the first marking is generated at temperatures above a transformation temperature of the glass of the glass tube semi-finished product.

5. The method according to claim 1, wherein the second marking is generated as a single marking at a predetermined position on the glass tube semi-finished product, the predetermined position being different from a position of the first marking.

6. The method according to claim 1, wherein the first and second markings are generated as a combined marking directly adjacent to each other on the glass tube semi-finished product.

7. The method according to claim 1, wherein the second marking is generated at temperatures below a transformation temperature of the glass of the glass tube semi-finished product by one of imprinting or stamping the second marking on the glass tube semi-finished product.

8. The method according to claim 1, wherein the second marking is generated during separation of the glass tube semi-finished product from a continuous strand of glass tubing.

9. The method according to claim 1, further comprising:
reading a first piece of information from the first marking provided on the glass tube semi-finished product;
reading a second piece of information from the second marking provided on the glass tube semi-finished product; and
tracking the glass tube semi-finished product by determining whether the first and second pieces of information are correctly linked to each other, in order to enable a determination regarding at least one of authenticity of the glass tube semi-finished product, origin of the glass tube semi-finished product, and origin of an apparatus with which at least one of the first marking and the second marking was generated on the glass tube semi-finished product.

10. The method according to claim 9, wherein determining whether the first and second pieces of information are correctly linked to each other includes checking whether the first and second pieces of information are linked to each other in accordance with a predetermined rule.

11. The method according to claim 9, wherein determining whether the first and second pieces of information are correctly linked to each other includes accessing a database via a network, said database storing a link between the information of the first marking and the second marking.

* * * * *